(12) United States Patent
Fujimura et al.

(10) Patent No.: US 11,193,179 B2
(45) Date of Patent: Dec. 7, 2021

(54) SEAMLESS STAINLESS STEEL PIPE FOR OIL COUNTRY TUBULAR GOODS AND METHOD OF MANUFACTURING THE SAME

(71) Applicant: JFE STEEL CORPORATION, Tokyo (JP)

(72) Inventors: Kazuki Fujimura, Handa (JP); Yasuhide Ishiguro, Handa (JP); Seigo Goto, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 334 days.

(21) Appl. No.: 15/543,813

(22) PCT Filed: Dec. 3, 2015

(86) PCT No.: PCT/JP2015/006001
§ 371 (c)(1),
(2) Date: Jul. 14, 2017

(87) PCT Pub. No.: WO2016/113794
PCT Pub. Date: Jul. 21, 2016

(65) Prior Publication Data
US 2017/0369963 A1 Dec. 28, 2017

(30) Foreign Application Priority Data

Jan. 15, 2015 (JP) .............................. JP2015-005631

(51) Int. Cl.
| | |
|---|---|
| *C21D 9/08* | (2006.01) |
| *C21D 6/00* | (2006.01) |
| *C22C 38/48* | (2006.01) |
| *C22C 38/46* | (2006.01) |
| *C22C 38/44* | (2006.01) |
| *C22C 38/50* | (2006.01) |
| *C22C 38/06* | (2006.01) |
| *C22C 38/04* | (2006.01) |
| *C22C 38/02* | (2006.01) |
| *C21D 8/10* | (2006.01) |
| *C22C 38/54* | (2006.01) |
| *C22C 38/42* | (2006.01) |
| *C22C 38/00* | (2006.01) |
| *C22C 38/58* | (2006.01) |
| *C22C 38/40* | (2006.01) |
| *C21D 1/25* | (2006.01) |

(52) U.S. Cl.
CPC ............ *C21D 9/085* (2013.01); *C21D 6/004* (2013.01); *C21D 6/005* (2013.01); *C21D 6/008* (2013.01); *C21D 8/10* (2013.01); *C21D 8/105* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 1/25* (2013.01); *C21D 2211/005* (2013.01); *C21D 2211/008* (2013.01)

(58) Field of Classification Search
CPC ............... C21D 1/25; C21D 2211/005; C21D 2211/008; C21D 6/004; C21D 6/005; C21D 6/008; C21D 8/10; C21D 8/105; C21D 9/085; C22C 38/00; C22C 38/001; C22C 38/002; C22C 38/02; C22C 38/04; C22C 38/06; C22C 38/40; C22C 38/42; C22C 38/44; C22C 38/46; C22C 38/48; C22C 38/50; C22C 38/54; C22C 38/58
See application file for complete search history.

(56) References Cited

U.S. PATENT DOCUMENTS

| | | | |
|---|---|---|---|
| 6,379,821 B2 | 4/2002 | Kushida et al. | |
| 7,767,037 B2* | 8/2010 | Kimura .................... | C21D 1/25 148/325 |
| 9,758,850 B2* | 9/2017 | Eguchi ..................... | C21D 9/08 |
| 2003/0127162 A1 | 7/2003 | Kidani et al. | |
| 2006/0243354 A1* | 11/2006 | Kimura .................... | C21D 1/25 148/592 |
| 2007/0074793 A1* | 4/2007 | Kimura .................... | C21D 1/25 148/592 |
| 2008/0047635 A1 | 2/2008 | Kondo et al. | |
| 2012/0118441 A1 | 5/2012 | Kondo et al. | |
| 2012/0328897 A1 | 12/2012 | Ohe et al. | |
| 2015/0047831 A1 | 2/2015 | Nakatsuka et al. | |
| 2015/0101711 A1* | 4/2015 | Miyata .................... | C21D 8/105 148/506 |

(Continued)

FOREIGN PATENT DOCUMENTS

| | | |
|---|---|---|
| EP | 1683885 A1 | 7/2006 |
| EP | 2256225 A1 | 12/2010 |

(Continued)

OTHER PUBLICATIONS

Oct. 9, 2017 Extended European Search Report issued in European Patent Application No. 15877751.6.

(Continued)

*Primary Examiner* — Jenny R Wu
(74) *Attorney, Agent, or Firm* — Oliff PLC

(57) ABSTRACT

A method of manufacturing a seamless stainless steel pipe for Oil Country Tubular Goods by heating a billet having a specified chemical composition including forming the billet into a seamless steel pipe by applying hot working to the billet, cooling the seamless steel pipe to a room temperature at a cooling rate of air cooling or more, thereafter, performing quenching by heating the seamless steel pipe to a temperature of 850° C. or above, subsequently, cooling the seamless steel pipe to a temperature of 100° C. or below at a cooling rate of air cooling or more, and subsequently, applying tempering to the seamless steel pipe at a temperature of 700° C. or below for a specific holding time.

12 Claims, 1 Drawing Sheet

(56) References Cited

U.S. PATENT DOCUMENTS

2015/0315667 A1 11/2015 Eguchi et al.
2015/0315684 A1 11/2015 Eguchi et al.

FOREIGN PATENT DOCUMENTS

| EP | 2341161 A1 | 7/2011 |
| EP | 2434030 A1 | 3/2012 |
| EP | 2562284 A1 | 2/2013 |
| EP | 2952592 A1 | 12/2015 |
| JP | 2005-336595 A | 12/2005 |
| JP | 2005336599 A | 12/2005 |
| JP | 2008-081793 A | 4/2008 |
| JP | 2010-209402 A | 9/2010 |
| JP | 2011-252222 A | 12/2011 |
| JP | 2012-149317 A | 8/2012 |
| JP | 2013-249516 A | 12/2013 |
| JP | 2014-114500 A | 6/2014 |
| JP | 2015-110822 A | 6/2015 |
| WO | 2011-021396 A1 | 2/2011 |
| WO | 2011-136175 A1 | 11/2011 |
| WO | 2013-146046 A1 | 10/2013 |
| WO | WO-2013179667 A1 * | 12/2013 ............. C21D 8/105 |
| WO | 2014/119251 A1 | 8/2014 |

OTHER PUBLICATIONS

Apr. 25, 2017 Office Action issued in Japanese Patent Application No. 2016-524542.
Sep. 6, 2018 Office Action issued in European Patent Application No. 15 877 751.6.
Mar. 8, 2016 Search Report issued in International Patent Application No. PCT/JP2015/006001.
Nov. 15, 2007 Office Action issued in U.S. Appl. No. 10/568,154.
Jun. 26, 2008 Office Action issued in U.S. Appl. No. 10/568,154.
Dec. 23, 2008 Office Action issued in U.S. Appl. No. 10/568,154.
Aug. 11, 2009 Office Action issued in U.S. Appl. No. 10/568,154.
Dec. 20, 2016 Office Action issued in U.S. Appl. No. 14/408,772.
Jun. 21, 2017 Office Action issued in U.S. Appl. No. 14/403,731.
Oct. 20, 2017 Office Action issued in U.S. Appl. No. 14/403,731.
Aug. 13, 2018 Office Action issued in U.S. Appl. No. 14/403,731.
Feb. 13, 2019 Office Action issued in U.S. Appl. No. 14/403,731.
Apr. 4, 2019 Office Action issued in European Patent Application No. 15877751.6.
Davis, Joseph R., "ASM Handbook-Wrought Stainless Steels", (1990), ASM International, 10th Edition, vol. 1, p. 852-853.

* cited by examiner

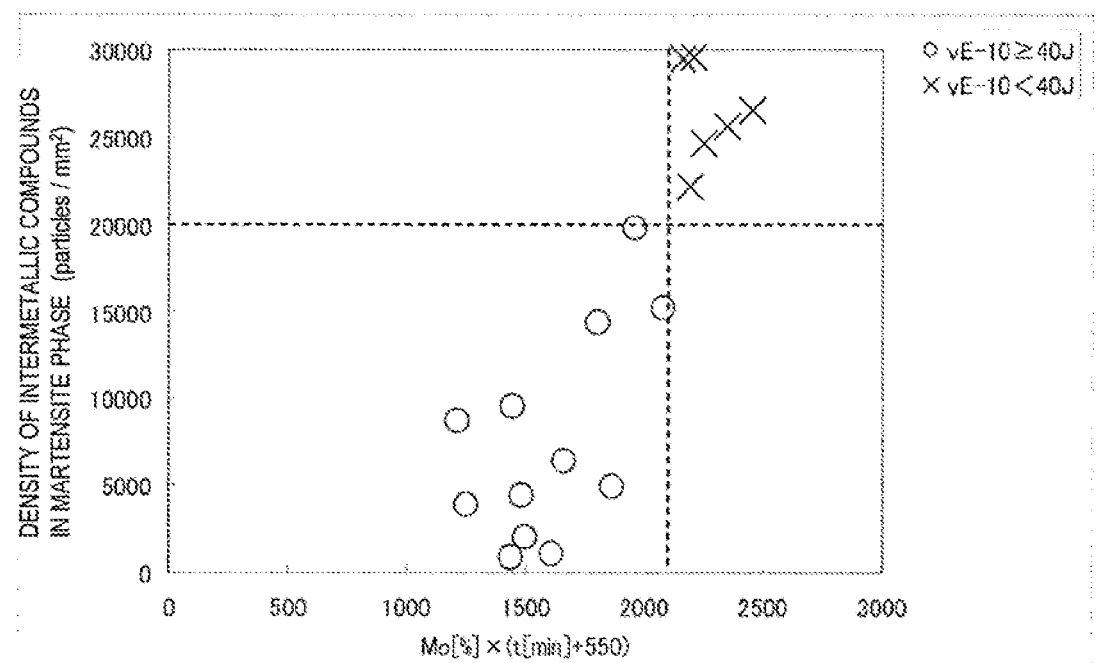

SEAMLESS STAINLESS STEEL PIPE FOR OIL COUNTRY TUBULAR GOODS AND METHOD OF MANUFACTURING THE SAME

TECHNICAL FIELD

This application relates to a seamless stainless steel pipe suitably used as a pipe for Oil Country Tubular Goods, and more particularly to a seamless stainless steel pipe having excellent corrosion resistance and further having high strength and high toughness, and a method of manufacturing such a seamless stainless steel pipe stably.

BACKGROUND

Recently, from a viewpoint of preventing the exhaustion of oil resource (that is, crude oil and a natural gas) in regions where oil drilling is easy, the development of oil fields in regions where oil drilling is difficult has been underway. However, for example, in oil fields for drilling oil resource in a layer at a large depth from a ground, it is necessary to drill wells (oil wells) to an extremely large depth. Further, in this case, the oil resource is at a high temperature. Accordingly, there has been a demand for a pipe for Oil Country Tubular Goods which has high strength and high toughness. Furthermore, in oil fields for drilling oil resource containing $CO_2$, $Cl^-$ and the like, the corrosion of a pipe for Oil Country Tubular Goods is liable to progress and hence, there has been a demand for a pipe for Oil Country Tubular Goods having corrosion resistance.

As a pipe for Oil Country Tubular Goods used in such a severe environment, a seamless steel pipe made of martensitic stainless steel containing approximately 13 masses of Cr (so-called 13Cr steel) has been practically used. Drilling of oil resource containing a large amount of $Cl^-$ and having a high temperature exceeding 100° C. has a drawback that a pipe for Oil Country Tubular Goods cannot have sufficient strength and corrosion resistance even when a seamless steel pipe made of 13Cr steel is used.

As a pipe for Oil Country Tubular Goods which can be used in a high-temperature corrosive environment, a seamless steel pipe made of two-phase stainless steel has been developed. However, in the case of two-phase stainless steel, not only that a large amount of alloy elements is added as a raw material so that a raw material cost is pushed up but also that hot workability in manufacturing steps of a seamless steel pipe is poor and hence, productivity is lowered and, as a result, there arises a drawback that a manufacturing cost of a seamless steel pipe is pushed up.

In view of the above, techniques have been under development to acquire a seamless stainless steel pipe which can be manufactured easily and stably through a series of steps using a piercing mill adopting a skew rolling process, a gene manufacturing technique of a seamless steel pipe, and which exhibits excellent corrosion resistance even at a high temperature, also having both high strength and high toughness.

For example, patent literature 1 discloses a technique where a seamless steel pipe is formed by hot working using a billet containing predetermined components, and quenching and tempering are applied to the seamless steel pipe thus acquiring a seamless stainless steel pipe which exhibits excellent corrosion resistance and has both high strength and high toughness. In this technique, however, a holding time in tempering is not taken into account. Since strength and toughness of a seamless stainless steel pipe changes corresponding to a holding time, a room for improvement still remains in such a technique from a viewpoint of the stable acquisition of desired strength.

Patent literature 2 discloses a technique where a seamless steel pipe is formed by hot working with a predetermined rolling reduction using a billet containing predetermined components, and quenching and tempering are applied to the seamless steel pipe thus acquiring a seamless stainless steel pipe which exhibits excellent corrosion resistance and has both high strength and high toughness. In this technique, however, a cooling stop temperature in quenching is not taken into account. Since strength of a seamless stainless steel pipe changes corresponding to a cooling stop temperature, a room for improvement still remains in such a technique from a viewpoint of the stable acquisition of desired strength.

CITATION LIST

Patent Literature

PTL 1: JP-A-2005-336595
PTL 2: JP-A-2013-249516

SUMMARY

Technical Problem

It is an object of the disclosed embodiments to overcome the drawbacks of the related art and to provide a method of manufacturing a seamless stainless steel pipe for Oil Country Tubular Goods with excellent hot workability by which a seamless stainless steel pipe for Oil Country Tubular Goods which has high strength of 110 ksi (0.758 MPa) or more in terms of yield strength, high toughness of 40 J or more in terms of absorption energy $vE_{-10}$ in a Charpy impact test at a test temperature of −10° C., and excellent corrosion resistance can be acquired, and a seamless stainless steel pipe for Oil Country Tubular Goods acquired by the method. Excellent corrosion resistance means that the seamless stainless steel pipe for Oil Country Tubular Goods exhibits corrosion resistance even at a high temperature of 230° C. or above in a corrosive environment containing $CO_2$ and $Cl^-$.

Solution to Problem

Inventors of the disclosed embodiments have studied an influence of quenching and tempering on toughness of a seamless stainless steel pipe. As a result, the inventors have found that the deterioration of toughness of the seamless stainless steel pipe is liable to be generated when the seamless stainless steel pipe contains a large amount of Mo and a holding time in tempering is excessively long. Eased on such finding, the inventors have investigated the microstructure of a seamless stainless steel pipe which has the large content of Mo and whose toughness is deteriorated by tempering carried out for a long time and the inventors have found that a large number of intermetallic compounds are precipitated in a martensite phase. This phenomenon means that a martensite phase is formed by quenching and, thereafter, intermetallic compounds are precipitated by tempering.

Next, intermetallic compounds precipitated in a martensite phase were investigated in detail. As a result, the following findings were obtained with respect to intermetallic compounds.

(a) Mo of high concentration is present in an intermetallic compounds.

(b) A particle diameter of intermetallic compounds largely influence toughness of a seamless stainless steel pipe.

(c) it is desirable that the number of intermetallic compounds (hereinafter referred to as "density") per a unit area (mm²) be small, and the density changes depending on a parameter P (Mo, t)=[% Mo]×(t+550) calculated using the content of Mo [% Mo] (mass %) in a seamless stainless steel pipe and a holding time t (min) of tempering (see FIG. 1).

That is, to acquire a seamless stainless steel pipe for Oil Country Tubular Goods having desired strength, toughness and corrosion resistance by overcoming the problems to be solved by the disclosed embodiments, it is necessary to suppress density of intermetallic compounds having a particle diameter of 0.5 µm or more to $2×10^4/mm^2$ or less, the intermetallic compounds being present in a martensite phase. Also to acquire the microstructure, it is necessary to adjust the content of Mo [% Mo] of a seamless stainless steel pipe for Oil Country Tubular Goods and a holding time t of tempering such that a parameter P(Mo, t) calculated using the content of Mo [% Mo] in a seamless stainless steel pipe for Oil Country Tubular Goods and a holding time t of tempering becomes 2100 or less. Further, to manufacture the seamless stainless steel pipe for Oil Country Tubular Goods stably, it is necessary to perform designing of composition for improving hot workability.

The disclosed embodiments have been made based on such findings.

That is, a method of manufacturing a, seamless stainless steel pipe for Oil Country Tubular Goods according to the disclosed embodiments is a method of manufacturing a seamless stainless steel pipe for Oil Country Tubular Goods in which a billet having a composition which contains, by mass %, 0.005 to 0.06% C, 0.05 to 0.5% Si, 0.2 to 1.8% Mn, 0.03% or less P, 0.005% or less S, 15.5 to 18.0% Cr, 1.0 to 3.5% Mo, 1.5 to 5.0% Ni, 0.02 to 0.2% V, 0.002 to 0.05% Al, 0.01 to 0.15% N and 0.006% or less O, and further contains one or two kinds of elements selected from a group consisting of 0.5 to 3.0% W and 0.5 to 3.5% Cu such that the contents of above-described C, Si, Mn, Cr, Mo, Ni, N, W and Cu satisfy following formulae (1) and (2), and Fe and unavoidable impurities as a balance is heated, the billet is formed into a seamless steel pipe by applying hot working to the billet, the seamless steel pipe is cooled to a room temperature at a cooling rate of air cooling or more, thereafter, quenching is performed by heating the seamless steel pipe to a temperature of 850° C. or above and, subsequently, by cooling the seamless steel pipe to a temperature of 100° C. or below at a cooling rate of air cooling or more and, subsequently, tempering is applied to the seamless steel pipe a temperature of 700° C. or below for a holding time which satisfies a following formula (3).

$$[\% Cr]+0.65[\% Ni]+0.6[\% Mo]+0.3[\% W]+0.55[\% Cu]-20[\% C] \geq 19.5 \quad (1)$$

$$[\% Cr]+[\% Mo]+0.5[\% W]+0.3[\% Si]-43.5[\% C]-0.4[\% Mn]-[\% Ni]-0.3[\% Cu]-9[\% N] \geq 11.5 \quad (2)$$

$$[\% Mo]×(t+550) \leq 2100 \quad (3)$$

[% C], [% Si], [% Mn], [% Cr], [% Mo], [% Ni], [% N], [% W], [% Cu]: contents (mass %) of respective elements, the content of the element being expressed as zero when the element is not contained.

t: holding time (min) of tempering

In the method of manufacturing a seamless stainless steel pipe for Oil Country Tubular Goods according to the disclosed embodiments, it is preferable that the billet contain, in addition to the above-mentioned composition, by mass %, one or two kinds or more of elements selected from a group consisting of 0.2% or less Nb, 0.3% or less Ti, 0.2% or less Zr and 0.01% or less B. It is preferable that the billet further contain, by mass %, 0.01% or less Ca.

A seamless stainless steel pipe for Oil Country Tubular Goods according to the disclosed embodiments is a seamless stainless steel pipe for Oil Country Tubular Goods having a composition which contains, by mass %, 0.005 to 0.06% C, 0.05 to 0.5% Si, 0.2 to 1.8% Mn, 0.03% or less P, 0.005% or less S, 15.5 to 18.0% Cr, 1.0 to 3.5% Mo, 1.5 to 5.0% Ni, 0.02 to 0.2% V, 0.002 to 0.05% Al, 0.01 to 0.15% N and 0.006% or less O, and further contains one or two kinds of elements selected from a group consisting of 0.5 to 3.0% W and 0.5 to 3.5% Cu such that the contents of C, Si, Mn, Cr, Mo, Ni, N, W and Cu satisfy following formulae (1) (2), and Fe and unavoidable impurities as a balance, wherein the steel pipe has a microstructure formed of 10 to 60 volume % of ferrite phase, 0 to 20 volume % of austenite phase and a remaining portion formed of a martensite phase, and density of intermetallic compounds being present in the martensite phase and having a particle diameter of 0.5 µm or more is $2×10^4/mm^2$ or less.

$$[\% Cr]+0.65[\% Ni]+0.6[\% Mo]+0.3[\% W]+0.55[\% Cu]-20[\% C] \geq 19.5 \quad (1)$$

$$[\% Cr]+[\% Mo]+0.5[\% W]+0.3[\% Si]-43.5[\% C]-0.4[\% Mn]-[\% Ni]-0.3[\% Cu]-9[\% N] \geq 11.5 \quad (2)$$

[% C], [% Si], [% Mn], [% Cr], [% Mo], [% Ni], [% N], [% W], [% Cu]: contents (mass %) of respective elements, the content of the element being expressed zero when the element is not contained.

In the seamless stainless steel pipe for Oil Country Tubular Goods according to the disclosed embodiments, it is preferable that the steel pipe contain, in addition to the above-mentioned composition, by mass %, one or two kinds or more of elements selected from a group consisting of 0.2% or less Nb, 0.3% or less Ti, 0.2% or less Zr and 0.01% or less B. It is preferable that the steel pipe further contain, by mass %, 0.01% or less Ca.

Advantageous Effects

According to the disclosed embodiments, it is possible to acquire stably a seamless stainless steel pipe for Oil Country Tubular Goods having both of high strength and high toughness and also having excellent corrosion resistance by the manufacturing method excellent in hot workability, and therefore a remarkable effect in industry is exerted.

BRIEF DESCRIPTION OF THE DRAWINGS

FIG. 1. is a graph showing the relationship between P (Mo, t)(=[% Mo]×(t+550)) and density of intermetallic compounds.

DETAILED DESCRIPTION

Firstly, the composition of a seamless stainless steel pipe for Oil Country Tubular Goods according to the disclosed embodiments is explained. In general, a seamless steel pipe is manufactured by applying hot working to a billet. Accordingly, the composition of the seamless stainless pipe for Oil Country Tubular Goods according to the disclosed embodiments is equal to the composition of a billet which a raw material for the seamless stainless steel pipe for Oil Country Tubular Goods. Hereinafter, "mass %" in the composition is simply referred to as "%".

C. 0.005 to 0.06%

C is an element having an action of increasing strength of a seamless stainless steel pipe for Oil Country Tubular Goods. When the content of C is less than 0.005%, the effect of such an action cannot be acquired. On the other hand, when the content of C exceeds 0.06%, corrosion resistance is remarkably deteriorated. Accordingly, the content of C is set to a value which falls within a range of 0.005 to 0.06%. The content of C is preferably set to a value which falls within a range of 0.01 to 0.04%

Si: 0.05 to 0.5%

Si is an element which functions as a deoxidizing agent in the process of making molten steel for a raw material of the seamless stainless steel pipe for Oil Country Tubular Goods. When the content of Si is less than 0.05%, the effect of such a deoxidizing agent cannot be acquired. On the other hand, when the content of Si exceeds 0.5%, not only that corrosion due to $CO_2$ is liable to progress, but also that hot workability in the manufacturing process of the seamless stainless steel pipe for Oil Country Tubular Goods is deteriorated. Accordingly, the content of Si is set to a value which falls within a range of 0.05 to 0.5%. The content of Si is preferably set to a value which falls within a range of 0.1 to 0.4%.

Mn: 0.2 to 1.8%

Mn is an element having an action of increasing strength of the seamless stainless steel pipe for Oil Country Tubular Goods. When the content of Mn is less than 0.2%, a desired strength cannot be acquired. On the other hand, when the content of Mn exceeds 1.8%, toughness is deteriorated. Accordingly, the content of Mn is set to a value which falls within a range of 0.2 to 1.8%. The content of Mn is preferably set to a value which falls within a range of 0.2 to 0.8%. The content of Mn is more preferably set to a value which falls within a range of 0.2 to 0.40%.

P: 0.03% or Less

P is an element which deteriorates corrosion resistance of the seamless stainless steel pipe for Oil Country Tubular Goods. When the content of P exceeds 0.03%, corrosion resistance is remarkably deteriorated. Accordingly, the content of P is set to 0.03% or less. However, to decrease the content of P to less than 0.005%, it takes a long time for dephosphorization treatment in the process of making molten steel, which causes pushing up of a manufacturing cost of the seamless stainless steel pipe for Oil Country Tubular Goods. Accordingly, the content of P is preferably set to 0.005% or more.

S: 0.005% or Less

S is an element which deteriorates hot workability in the manufacturing process of the seamless stainless steel pipe for Oil Country Tubular Goods. When the content of S exceeds 0.05%, the manufacture of the seamless stainless steel pipe for Oil Country Tubular Goods is obstructed. Accordingly, the content of S is set to 0.005% or less. However, in order to decrease the content of S to less than 0.0005%, it takes a long time for desulfurization treatment in the process of making molten steel, which causes pushing up of a manufacturing cost of the seamless stainless steel pipe for Oil Country Tubular Goods. Accordingly, the content of S is preferably set to 0.0005% or more.

Cr: 15.5 to 18.0%

Cr is an element having an action of improving corrosion resistance of the seamless stainless steel pipe for Oil Country Tubular Goods and particularly contributes to the prevention of corrosion caused by $CO_2$ in a high temperature environment. When the content of Cr is less than 15.5%, the effect of such an action cannot be acquired. On the other hand, when the content of Cr exceeds 18.0%, hot workability in the manufacturing process of the seamless stainless steel pipe for Oil Country Tubular Goods is deteriorated. Further, when the content of Cr exceeds 18.0%, strength of the seamless stainless steel pipe for Oil Country Tubular Goods is lowered. Accordingly, the content of Cr is set to a value which falls within a range of 15.5 to 18.0%. The content of Cr is preferably set to a value which falls within a range of 16.0 to 17.5%. The content of Cr is more preferably set to a value which falls within a range of 16.5 to 17.0%.

Mo: 1.0 to 3.5%

Mo is an element having an action of improving corrosion resistance of the seamless stainless steel pipe for Oil Country Tubular Goods and particularly contributes to the prevention of pitting corrosion caused by $Cl^-$. When the content of Mo is less than 1.0%, the effect of such an action cannot be acquired. On the other hand, when the content of Mo exceeds 3.5%, strength is lowered. Further, when the content of Mo exceeds 3.5%, toughness is deteriorated. Still further, when the content of Mo exceeds 3.5%, a manufacturing cost of the seamless stainless steel pipe for Oil Country Tubular Goods is pushed up. Accordingly, the content of Mo is set to a value which falls within a range of 1.0 to 3.5%. The content of Mo is preferably set to a value which falls within a range of 1.5 to 3.0%. The content of Mo is more preferably set to a value which falls within a range of 2.0 to 3.0%.

Even in the case where the content of Mo falls within the above-mentioned range, when a holding time in tempering is long, intermetallic compounds are precipitated in a martensite phase and hence, toughness of the seamless stainless steel pipe for Oil Country Tubular Goods is deteriorated. Therefore, the content of Mo [% Mo] of the seamless stainless steel pipe for Oil Country Tubular Goods and a holding time t of tempering are adjusted such that a parameter P (Mo, t)(=[% Mo]×(t+550)) satisfies the following formula (3).

$$[\% Mo] \times (t+550) \leq 2100 \quad (3)$$

[% Mo]: content (mass %) of Mo
t: holding time (min) of tempering

Ni: 1.5 to 5.0%

Ni is an element having an action of improving corrosion resistance of the seamless stainless steel pipe for Oil Country Tubular Goods and an action of increasing strength thereof. When the content of Ni is less than 1.5%, the effect of such actions cannot be acquired. On the other hand, when the content of Ni exceeds 5.0%, a martensite phase is minimally generated and hence, strength of the seamless stainless steel pipe for Oil Country Tubular Good is lowered. Accordingly, the content of Ni is set to a value which falls within a range of 1.5 to 5.0%. The content of Ni is preferably set to a value which falls within a range of 3.0 to 4.5%. The content of Ni is more preferably set to a value which falls within a range of 3.0 to 4.0%.

V: 0.02 to 0.2%

V is an element having an action of improving corrosion resistance of the seamless stainless steel pipe for Oil Country Tubular Goods and an action of increasing strength thereof. When the content of V is less than 0.02 mass %, the effect of such actions cannot be acquired. On the other hand, when the content of V exceeds 0.2 mass %, toughness is deteriorated. Accordingly, the content of V is set to a value which falls within a range of 0.02 to 0.2%. The content of V is preferably set to a value which falls within a range of 0.03 to 0.08%.

Al: 0.002 to 0.05%

Al is an element which functions as a deoxidizing agent in the process of making molten steel for a raw material of the seamless stainless steel pipe for Oil Country Tubular Goods. When the content of Al is less than 0.002%, the effect of such a deoxidizing cannot be acquired. On the other hand, when the content of Al exceeds 0.05%, alumina inclusion is liable to be precipitated and hence, hot workability in the manufacturing process of the seamless stainless steel pipe for Oil Country Tubular Goods is deteriorated. Further, when the content of Al exceeds 0.05%, toughness is deteriorated. Accordingly, the content of Al is set to a value which falls within a range of 0.002 to 0.05%. The content of Al is preferably set to a value which fails within a range of 0.01 to 0.04%.

N: 0.01 to 0.15%

N is an element having an action of improving corrosion resistance of the seamless stainless steel pipe for Oil Country Tubular Goods. When the content of N is less than 0.01%, the effect such an action cannot be acquired. On the other hand, when the content of N exceeds 0.15%, N combines with several ids of elements to precipitate nitrides and hence, toughness of the seamless stainless steel pipe for Oil Country Tubular Goods is deteriorated. Accordingly, the content of N is set to a value which falls within a range of 0.01 to 0.15%.

O: 0.006 or Less

O (oxygen) is an element which is present in the seamless stainless steel pipe for Oil Country Tubular Goods as an oxide and exerts an adverse effect not only on hot workability but also on toughness and corrosion resistance. When the content of O exceeds 0.006%, O causes deterioration of hot workability, deterioration of toughness and deterioration of corrosion resistance. Accordingly, the content of O is set to 0.006% or less. The content of O is preferably set to 0.005% or less.

One or Two Kinds Selected from a Group Consisting of W: 0.5 to 3.0% and Cu: 0.5 to 3.5%

In the same manner as Mo, W is an element having an action of improving corrosion resistance of the seamless stainless steel pipe for Oil Country Tubular Goods and particularly contributes to the prevention of pitting corrosion caused by $Cl^-$. However, when the content of W exceeds 3.0%, toughness of the seamless stainless steel pipe for Oil Country Tubular Goods is deteriorated. Accordingly, in the case where the seamless stainless steel pipe for Oil Country Tubular Goods contains W, the content of W is set to 3.0% or less. On the other hand, also in the case where the seamless stainless steel pipe for Oil Country Tubular Goods contains W, when the content of W is less than 0.5%, a corrosion resistance improving effect cannot be acquired and hence, the content of W is set to 0.5% or more. Consequently, the content of W is set to a value which falls within a range of 0.5 to 3.0%. The content of W is preferably set to a value which falls within a range of 0.5 to 2.5%. The content of W is more preferably set to a val which falls within a range of 0.5 to 1.0%.

Cu is an element having an action of suppressing intrusion of hydrogen into the seamless stainless steel pipe for Oil Country Tubular Goods and contributes to the improvement of corrosion resistance. However, when the content of Cu exceeds 3.5%, hot workability in the manufacturing process of the seamless stainless steel pipe for Oil Country Tubular Goods is deteriorated. Accordingly, in the case where the seamless stainless steel pipe for Oil Country Tubular Goods contains Cu, the content of Cu is set to 3.5% or less. On the other hand, also in the case where the seamless stainless steel pipe for Oil Country Tubular Goods contains Cu, when the content of Cu is less than 0.5%, a corrosion resistance improving effect cannot be acquired and hence, the content of Cu is set to 0.5% or more. Consequently, the content of Cu is set to a value which falls within a range of 0, to 3.5%. The content of Cu is preferably set to a value which fells within a range of 0.5 to 2.5%. The content of Cu is more preferably set to a value which falls within a range of 0.5 to 1.0%.

The contents of the respective elements C, Si, Mn, Cr, Mo, Ni, N, W and Cu are adjusted within the above-mentioned ranges such that the following formulae (1) and (2) are satisfied. In the formulae (1) and (2), [% C], [% Si], [% Mn], [% Cr], [% Mo], [% Ni], [% N], [% W] and [% Cu] indicate the contents (mass %) of the respective elements, and the content of the element is expressed as zero when the element is not contained.

$$[\% \text{Cr}]+0.65[\% \text{Ni}]+0.6[\% \text{Mo}]+0.3[\% \text{W}]+ 0.55[\% \text{Cu}]-20[\% \text{C}] \geq 19.5 \qquad (1)$$

$$[\% \text{Cr}]+[\% \text{Mo}]+0.5[\% \text{W}]+0.3[\% \text{Si}]- 43.5[\% \text{C}]-0.4[\% \text{Mn}]-[\% \text{Ni}]-0.3[\% \text{Cu}]- 9[\% \text{N}] \geq 11.5 \qquad (2)$$

By setting the contents of Cr, Ni, Mo, W, Cu and C such that the contents satisfy the formula (1) (by setting a value of the left side of the formula (1) to 19.5 or more), even in a corrosive environment which contains $CO_2$ and $Cl^-$ and is besides at a high temperature (up to 230° C. at maximum), a seamless stainless steel pipe for Oil Country Tubular Goods having sufficient corrosion resistance can be acquired. From a viewpoint of achieving the further improvement of corrosion resistance, it is preferable that the value of the left side of the above-mentioned formula (1) be 20.0 or more.

Further, by setting the contents of Cr, Mo, W, Si, C, Mn, Ni, Cu and N such that the contents satisfy the formula (2) (by setting a value of the left side of the formula (2) to 11.5 or more), in manufacturing steps of the seamless stainless steel pipe for Oil Country Tubular Goods, sufficient hot workability can be acquired. From a viewpoint of achieving the further improvement of hot workability, it is preferable that the value of the left side of the above-mentioned formula (2) be 12.5 or more.

The balance other than the above-mentioned component is formed of Fe and unavoidable impurities.

In addition to these elements, the seamless stainless steel pipe for Oil Country Tubular Goods may contain one or two kinds or more of elements selected from a group consisting of 0.2% or less Nb, 0.3% or less Ti, 0.2% or less Zr and 0.01% or less B.

All of Nb, Ti, Zr and B are elements having an action of increasing strength of the seamless stainless steel pipe for Oil Country Tubular Goods, and may be added when necessary. However, when the contents of these elements are excessively large, toughness of the seamless stainless steel pipe for Oil Country Tubular Goods is deteriorated. Accordingly, the seamless stainless steel pipe for Oil Country Tubular Goods preferably contains 0.2% or less Nb, 0.3% or less Ti, 0.2% or less Zr and 0.01% or less B. On the other hand, when the contents of these elements are excessively small, the seamless stainless steel pipe for Oil Country Tubular Goods cannot acquire a strength increasing effect. Accordingly, the seamless stainless steel pipe for Oil Country Tubular Goods more preferably contains 0.02% or more Nb, 0.04% or more Ti, 0.02% or more Zr and 0.001% or more B.

Ca: 0.01 Mass % or Less

Ca is an element having an action of spheroidizing sulfide-based inclusions. By spheroidizing sulfide-based inclusions, lattice strain around the spheroidized sulfide-based inclusions becomes small and hence, Ca suppress trapping of H and hence, Ca contributes to the improvement of corrosion resistance of the seamless stainless steel pipe for Oil Country Tubular Goods. However, when the content of Ca exceeds 0.01%, oxide-based inclusions are increased and hence, corrosion resistance is deteriorated. Accordingly, the content of Ca is preferably set to 0.01% or less. On the other hand, when the content of Ca is less than 0.0005%, a corrosion resistance improving effect cannot be acquired. Consequently, the content of Ca is more preferably set to a value which falls within a range of 0.0005 to 0.01%.

Next, steps of manufacturing a seamless stainless steel pipe for Oil Country Tubular Goods are described.

A means for making molten steel which is a raw material for a seamless stainless steel pipe for Oil Country Tubular Goods is not particularly limited, and a usual technique (for example, a converter, an electric furnace or the like) is used. Further, degassing treatment may be applied when necessary.

After making molten steel containing the components described previously, the molten steel is cast into an ingot or a slab by a usual technique (for example, continuous casting, ingot making or the like) and is formed into a billet. The billet is used as a raw material for a seamless stainless steel pipe for Oil Country Tubular Goods.

In steps of manufacturing a seamless stainless steel pipe for Oil Country Tubular Goods from a billet, the billet is subjected to conventionally known hot working (for example, hot rolling of a Mannesmann-plug mill type, hot rolling of a Mannesmann-mandrel mill type or the like) and, thereafter, is cooled to a room temperature at a cooling rate of air cooling or more thus acquiring a seamless stainless steel pipe for Oil Country Tubular Goods. Cooling at a cooling rate of air cooling or more means forced cooling (for example, immersing, injection or the like) using a refrigerant (for example, cooling water or the like) or air cooling. A cooling rate of air cooling or more indicates a cooling rate of 0.1° C./s or more. A room temperature indicates a temperature which falls within a range of 0 to 40° C.

When a heated temperature of a billet prior to hot working is excessively low, deformation resistance of the billet is increased and hence, there may be a case where an excessively large load is applied to a piercing mill (for example, a piercer mill or the like) thus causing a facility defect. On the other hand, when the heating temperature is excessively high, crystal grains of the billet becomes coarse and hence, crystal grains of a seamless stainless steel pipe for Oil Country Tubular Goods acquired through subsequent steps also becomes coarse thus deteriorating toughness of the seamless stainless steel pipe for Oil Country Tubular Goods. Further, a scale loss is increased and hence, a yield rate is lowered. Accordingly, it is preferable that a heating temperature of the billet be set to a value which falls within a range of 1100 to 1300° C. It is more preferable that the heating temperature of the billet be set to a value which falls within a range of 1200 to 1280° C.

Hot working including piercing rolling is applied to the billet heated as described above. With respect to such hot working, the disclosed embodiments are applicable to, for example, hot rolling of a Mannesmann-plug mill type which can acquire a seamless stainless steel pipe for Oil Country Tubular Goods through a piercer mill, then an elongater mill, a plug mill, a reeler mill and a sizing mill or hot rolling of a Mannesmann-mandrel mill type which can acquire a seamless stainless steel pipe for Oil Country Tubular Goods through a piercer mill, mandrel mill and a reducer mill.

The seamless stainless steel pipe for Oil Country Tubular Goods acquired by hot working is readily cooled to a room temperature at a cooling rate of air cooling or more. As a result, a martensite phase is formed in the seamless stainless steel pipe for Oil Country Tubular Goods. The cooling rate of air cooling or more indicates a cooling rate of 0.1° C./s or more. The room temperature indicates a temperature which falls within a range of 0 to 40° C.

Quenching is applied to the seamless stainless steel pipe for Oil Country Tubular Goods cooled to a room temperature so that the martensite phase is further increased.

When a heating temperature prior to quenching (hereinafter referred to as a quenching temperature) is excessively low, a martensite phase is not sufficiently generated and hence, the seamless stainless steel pipe for Oil Country Tubular Goods having desired strength cannot be acquired. Accordingly, the quenching temperature is set to 850° C. or above. On the other hand, when the quenching temperature is excessively high, a martensite phase is excessively formed and hence, there may be a case where the seamless stainless steel pipe for Oil Country Tubular Goods having desired toughness cannot be acquired. Consequently, it is preferable that the quenching temperature be set to a value which falls within a range of 850 to 1000° C. It more preferable that the quenching temperature be set to a value which falls within a range of 920 to 980° C. When a holding time at this quenching temperature is excessively short, fraction ratios do not reach an equilibrium and hence, there may be a case where the seamless stainless steel pipe for Oil Country Tubular Goods cannot acquire a uniform microstructure. On the other hand, when the holding time is excessively long, the microstructure becomes coarse and hence, there may be a case where toughness deteriorated. Accordingly, it is preferable to set the holding time to a value which falls within a range from 10 to 120 minutes.

Then, quenching is performed by cooling the seamless stainless steel pipe for Oil Country Tubular Goods heated to a predetermined quenching temperature to a temperature of 100° C. or below at a cooling rate of air cooling or more. When a temperature at which quenching is stopped is more than 100° C., an austenite phase is not sufficiently transformed into a martensite phase and hence, the seamless stainless steel pipe for Oil Country Tubular Goods cannot acquire desired strength. Accordingly, such a quenching stop temperature is not desirable. The cooling rate of air cooling or more indicates a cooling rate of 0.1° C./s or more.

After quenching is completed, tempering is applied to the seamless stainless steel pipe for Oil Country Tubular Goods. When a heating temperature in tempering (hereinafter referred to as tempering temperature) is excessively high, intermetallic compounds are liable to be precipitated in a martensite phase so that toughness of the seamless stainless steel pipe for Oil Country Tubular Goods is deteriorated. Accordingly, the tempering temperature is set to 700° C. or below. On the other hand, when the tempering temperature is excessively low, toughness deteriorated by quenching is not sufficiently restored. Consequently, it is preferable that the tempering temperature be set to a value which falls within a range of 400 to 700° C.

With respect to a holding time during which the seamless stainless steel pipe for Oil Country Tubular Goods is held at a predetermined tempering temperature in tempering, it is necessary to set the holding time such that the following formula (3) is satisfied. Unless the formula (3) is satisfied, toughness of the seamless stainless steel pipe for Oil Country Tubular Goods is deteriorated.

$$[\% \text{ Mo}] \times (t+550) \qquad (3)$$

[% Mo]: content (mass %) of Mo
t: holding time (min) in tempering

When a predetermined holding time elapses, it is preferable to cool the seamless stainless steel pipe for Oil Country Tubular Goods to a room temperature. Such cooling may preferably be air cooling. Alternatively, the seamless stainless steel pipe for Oil Country Tubular Goods may be forcibly cooled (for example, immersing, injection or the like) using a refrigerant (for example, cooling water or the like). The room temperature indicates a temperature which falls within a range of 0 to 40° C.

The seamless stainless steel pipe for Oil Country Tubular Goods manufactured in this manner has the above-mentioned composition and, at the same time, has the microstructure formed of 10 to 60 volume % of ferrite phase, 0 to 20 volume % of austenite phase, and a remaining portion being martensite phase. When the fraction of the ferrite phase is less than 10 volume %, hot workability of the seamless stainless steel pipe for Oil Country Tubular Goods is deteriorated, while when the fraction of the ferrite phase exceeds 60 volume %, strength and toughness of the seamless stainless steel pipe for Oil Country Tubular Goods are deteriorated. When the fraction of austenite phase exceeds 20 volume %, the seamless stainless steel pipe for Oil Country Tubular Goods having desired strength cannot be acquired.

With respect to a method of determining the microstructure of the seamless stainless steel pipe for Oil Country Tubular Goods according to the disclosed embodiments, firstly, a specimen for microstructure observation is sampled from a wall-thickness center portion of the steel pipe. A cross section in the wall thickness direction of the specimen is polished and, thereafter, is etched using a Villella etching solution (prepared by mixing a picric acid, a hydrochloric acid and ethanol at ratio of 2 g, 10 ml and 100 ml, respectively), and a microstructure photograph is taken using an optical microscope (magnification: 100 to 1000 times). A martensite phase (M phase), a ferrite phase (α phase) and an austenite phase (γ phase) are determined from the microstructure photograph, and a fraction (volume ratio) of the α phase is calculated by an image analysis.

Diffracted X-ray integral intensities of a (220) plane of the γ phase and a (211) plane of the α phase are measured by an X-ray diffraction method and the fraction (volume ratio) of the γ phase is calculated using the following formula.

γ phase volume ratio (%)=100/<1+{(Iα×Rγ)/(Iγ×Rα)}>

Iα: integral intensity of α phase
Iγ: integral intensity of γ phase
Rα: crystallographical theoretic calculation value of α phase
Rγ: crystallographical theoretic calculation value of γ phase A fraction (volume ratio) of M phase is calculated as a balance other than those of the α phase and the γ phase.

Here, in the disclosed embodiments, intermetallic compounds having a particle diameter of 0.5 μm or more are precipitated and present in the martensite phase at density of $2 \times 10^4/\text{mm}^2$ or less. By suppressing the precipitation of intermetallic compounds in this manner, it is possible to acquire a seamless stainless steel pipe for Oil Country Tubular Goods having desired strength, toughness and corrosion resistance. Further, the billet used as a raw material for manufacturing a seamless stainless steel pipe for Oil Country Tubular Goods also has the composition designed so as to improve hot workability and hence, it is possible to stably acquire a seamless stainless steel pipe for Oil Country Tubular Goods.

In a method of measuring the number of intermetallic compounds, firstly, the microstructure photographs of the specimens which are etched using a Villella etching solution are taken by an optical microscope (magnification: 2000 times). Then, an equivalent circle diameter of the intermetallic compounds precipitated in a martensite phase is calculated as a particle diameter of the intermetallic compounds from the microstructure photograph, and the number of intermetallic compounds having a particle diameter of 0.5 μm or more is counted.

EXAMPLES

Molten steel having the composition described in Table 1 was made, degassing being applied to the molten steel and, subsequently, a billet (100 kg steel ingot) was manufactured by an ingot making method, then the billet being cooled to a room temperature (25° C.). Then, the billet was heated at a temperature of 1230° C. in a heating furnace and, thereafter, piercing rolling was applied to the billet by an experimenting machine of a piercer. Then, the pierced billet was water-cooled by being immersed into water vessel, and thus a seamless steel pipe (outer diameter: 83.8 mm (=3.3 inches), wall thickness 12.7 mm (=0.5 inches) was prepared.

TABLE 1

| Steel symbol | Component composition (mass %) | | | | | | | | | | | | | | |
|---|---|---|---|---|---|---|---|---|---|---|---|---|---|---|---|
| | C | Si | Mn | P | S | Cr | Mo | Ni | V | Al | N | O | W | Cu | Nb, Ti, Zr, B, Ca |
| B | 0.018 | 0.24 | 0.64 | 0.02 | 0.001 | 16.1 | 2.48 | 3.55 | 0.040 | 0.03 | 0.068 | 0.0041 | 0.94 | 0.77 | Nb: 0.077 |
| C | 0.023 | 0.19 | 0.58 | 0.02 | 0.001 | 17.4 | 2.78 | 3.86 | 0.038 | 0.02 | 0.051 | 0.0018 | 0.70 | 0.02 | Nb: 0.031, Ti: 0.066, Zr: 0.079, B: 0.0018 |
| D | 0.028 | 0.16 | 0.52 | 0.02 | 0.001 | 16.4 | 3.11 | 3.74 | 0.034 | 0.02 | 0.043 | 0.0027 | 0.01 | 0.81 | Nb: 0.027, B: 0.0011 |
| E | 0.018 | 0.18 | 0.44 | 0.01 | 0.001 | 16.3 | 1.69 | 2.77 | 0.058 | 0.02 | 0.071 | 0.0039 | 0.79 | 0.04 | Ti: 0.051 |
| F | 0.033 | 0.27 | 0.24 | 0.01 | 0.001 | 16.1 | 1.21 | 4.62 | 0.033 | 0.01 | 0.065 | 0.0034 | 1.03 | 1.15 | Nb: 0.048 |
| G | 0.024 | 0.26 | 0.35 | 0.02 | 0.002 | 16.6 | 2.58 | 3.19 | 0.065 | 0.02 | 0.046 | 0.0029 | 0.55 | 0.59 | — |
| H | 0.036 | 0.19 | 0.29 | 0.01 | 0.001 | 16.9 | 2.43 | 3.56 | 0.049 | 0.03 | 0.029 | 0.0033 | 0.02 | 0.95 | Ca: 0.0024 |
| I | 0.049 | 0.22 | 0.38 | 0.01 | 0.001 | 16.7 | 2.49 | 3.82 | 0.057 | 0.01 | 0.049 | 0.0045 | 0.89 | 0.01 | Nb: 0.055, Ca: 0.0017 |
| J | 0.055 | 0.31 | 0.35 | 0.01 | 0.001 | 16.5 | 2.13 | 3.02 | 0.051 | 0.01 | 0.042 | 0.038 | 0.75 | 0.83 | Ti: 0.049, B: 0.0021 |
| K | 0.053 | 0.13 | 0.34 | 0.02 | 0.001 | 16.5 | 2.06 | 3.93 | 0034 | 0.01 | 0.068 | 0.034 | 0.01 | 0.98 | Ti: 0.044, B: 0.0017 |

*Balance other than the components described in Table 1 being Fe and unavoidable impurities The relationship between the compositions of steels (steel symbols B to I) described in Table 1 and the following formulae (1), (2) are described in Table 2.

$$[\% \, Cr] + 0.65[\% \, Ni] + 0.6[\% \, Mo] + 0.3[\% \, W] + 0.55[\% \, Cu] - 20[\% \, C] \geq 19.5 \quad (1)$$

$$[\% \, Cr] + [\% \, Mo] + 0.5[\% \, W] + 0.3[\% \, Si] - 43.5[\% \, C] - 0.4[\% \, Mn] - [\% \, Ni] - 0.3[\% \, Cu] - 9[\% \, N] \geq 11.5 \quad (2)$$

TABLE 2

| Steel symbol | Presence or non-presence of satisfaction of formula (1)* | | Presence or non-presence of satisfaction of formula (2)** | | Remarks |
|---|---|---|---|---|---|
| | Calculated value of left side | Determination | Calculated value of left side | Determination | |
| B | 20.24 | satisfied | 13.69 | satisfied | example |
| C | 21.34 | satisfied | 15.03 | satisfied | example |
| D | 20.59 | satisfied | 13.77 | satisfied | example |
| E | 19.01 | not satisfied | 14.06 | satisfied | comparison example |
| F | 20.11 | satisfied | 10.82 | not satisfied | comparison example |
| G | 20.23 | satisfied | 14.57 | satisfied | example |
| H | 20.48 | satisfied | 13.61 | satisfied | example |
| I | 19.97 | satisfied | 13.15 | satisfied | example |
| J | 19.32 | not satisfied | 12.92 | satisfied | comparison example |
| K | 19.77 | satisfied | 11.33 | not satisfied | comparison example |

*$[\% \, Cr] + 0.65[\% \, Ni] + 0.6[\% \, Mo] + 0.3[\% \, W] + 0.55[\% \, Cu] - 20[\% \, C] \geq 19.5 \ldots (1)$
**$[\% \, Cr] + [\% \, Mo] + 0.5[\% \, W] + 0.3[\% \, Si] - 43.5[\% \, C] - 0.4[\% \, Mn] - [\% \, Ni] - 0.3[\% \, Cu] - 9[\% \, N] \geq 11.5 \ldots (2)$ Inner surfaces and outer surfaces of manufactured seamless steel pipes were observed with naked eyes, and hot workability was evaluated. The results are described in Table 4. In Table 4, the evaluation "present" was given to the seamless steel pipes where a crack having a length of 5 mm or more was found, and otherwise, "not present" was given.

Quenching and tempering were applied to the manufactured seamless steel pipes. Thereafter, specimens were sampled from the resultant seamless steel pipes, and the microstructure, tensile property, toughness and corrosion resistance were investigated. The investigation method is described later. Here, conditions on heating temperature, holding time, a cooling means and cooling stop temperature in quenching, conditions on heating temperature and holding time in tempering, and a calculated value of the left side of the following formula (3) relating to tempering are described in Table 3.

TABLE 3

| Steel pipe No. | Steel symbol | Quenching | | | | Tempering | | Determining satisfaction of formula (3)* | | Remarks |
|---|---|---|---|---|---|---|---|---|---|---|
| | | Heating temperature (°C.) | Holding time (min) | Cooling means | Cooling stop temperature (°C.) | Heating temperature (°C.) | Holding time (min) | Calculated value of left side | Determination | |
| 5 | B | 920 | 30 | water cooling | 25 | 600 | 30 | 1438.4 | satisfied | example |
| 6 | B | 920 | 30 | water cooling | 25 | 570 | 120 | 1661.6 | satisfied | example |
| 7 | B | 920 | 30 | water cooling | 25 | 560 | 240 | 1959.2 | satisfied | example |
| 8 | B | 920 | 30 | water cooling | 25 | 550 | 360 | 2256.8 | not satisfied | comparison example |
| 9 | C | 920 | 30 | water cooling | 25 | 600 | 30 | 1612.4 | satisfied | example |
| 10 | C | 920 | 30 | water cooling | 25 | 570 | 120 | 1862.6 | satisfied | example |
| 11 | C | 920 | 30 | water cooling | 25 | 560 | 240 | 2196.2 | not satisfied | comparison example |
| 12 | D | 960 | 30 | water cooling | 25 | 600 | 30 | 1803.8 | satisfied | example |
| 13 | D | 960 | 30 | water cooling | 25 | 570 | 120 | 2083.7 | satisfied | example |
| 14 | D | 960 | 30 | water cooling | 25 | 560 | 240 | 2456.9 | not satisfied | comparison example |
| 15 | E | 960 | 30 | water cooling | 25 | 570 | 120 | 1132.3 | satisfied | comparison example |
| 16 | F | 960 | 30 | water cooling | 25 | 570 | 120 | 810.7 | satisfied | comparison example |
| 17 | G | 920 | 80 | water cooling | 0 | 600 | 30 | 1496.4 | satisfied | example |
| 18 | G | 920 | 80 | water cooling | 0 | 550 | 360 | 2347.8 | satisfied | comparison example |
| 19 | H | 960 | 80 | air cooling | 15 | 590 | 60 | 1482.3 | satisfied | example |
| 20 | H | 960 | 80 | air cooling | 15 | 550 | 360 | 2211.3 | satisfied | comparison example |
| 21 | I | 960 | 30 | water cooling | 40 | 600 | 30 | 1444.2 | satisfied | example |
| 22 | I | 960 | 30 | water cooling | 40 | 560 | 320 | 2166.3 | satisfied | comparison example |
| 23 | J | 920 | 30 | water cooling | 15 | 590 | 40 | 1256.7 | satisfied | comparison example |
| 24 | K | 920 | 30 | water cooling | 15 | 590 | 40 | 1215.4 | satisfied | comparison example |

*$[\% \, Mo] \times (t + 550) \leq 2100 \ldots (3)$ (A) Microstructure

Specimens for microstructure observation were sampled from wall thickness center portions of seamless steel pipes which had been quenched and tempered. Cross sections of the specimens in the wall thickness direction were polished and, thereafter, etched using a Villella etching solution. Then, the photographs of the microstructures were taken through an optical microscope magnification: 100 to 1000 times). A martensite phase (hereinafter described as "M phase"), a ferrite phase (hereinafter described as "α phase"), and an austenite phase (hereinafter described as "γ phase") were determined from the photographs of the microstructures, and a fraction of the α phase (volume ratio) was calculated by image analyzing. The results are described in Table 4.

Diffracted X-ray integral intensities of a (220) plane of the γ phase and a (211) plane of the α phase were measured by an X-ray diffraction method, and a fraction (volume ratio) of the γ phase was calculated using the following formula. The results are described in Table 4.

volume ratio of γ phase (%)=100/<1+{(Iα×Rγ)/(Iγ×Rα)}>

Iα: integral intensity of α phase
Iγ: integral intensity of γ phase
Rα: crystallographical theoretic calculation value of α phase
Rγ: crystallographical theoretic calculation value of γ phase A fraction (volume ratio) of the M phase is shown in Table 4 as a balance other than the fractions of the α phase and the γ phase.

Next, the microstructure photographs of the specimens which were etched using a Villella etching solution (reagent prepared by mixing a picric acid, a hydrochloric acid and ethanol at ratios of 2 g, 10 ml and 100 ml respectively) were taken through an optical microscope (magnification: 2000 times). Using the microstructure photograph the number of intermetallic compounds having a particle diameter (equivalent circle diameter) of 0.5 μm or more which were precipitated in the M phase was counted. The results are described in Table 4 as the number of intermetallic compounds per unit area (mm$^2$).

(B) Tensile Properties

API arcuate tensile test specimens were sampled from wall-thickness center portions of seamless steel pipes which had been quenched and tempered such that the tensile direction is aligned with the pipe-axis direction in accordance with the provision stipulated in API standard. The tensile test was further carried out in accordance with the provision stipulated in API standard, and, as tensile properties, yield strength YS (MPa) and tensile strength TS (MPa) were measured. The results are described in Table 4. The evaluation "qualified" was given to the specimens where the yield strength YS is 758 MPa or more, and the evaluation "not qualified" was given to the specimens where the yield strength YS is less than 758 MPa.

(C) Toughness

In accordance with the ISO standard, fir-notched specimens (thickness: 10 mm) were sampled from wall-thickness center portions of seamless steel pipes which had been quenched and tempered such that the length of the specimen is taken in the circumferential direction. Then, the Charpy impact test was carried cut under a test temperature of −10° C., and an absorbed energy $vE_{-10}$ (J) was measured. The results are described in Table 4. Three specimens were used in each test, and an arithmetic mean value of absorbed energies of three specimens was shown in Table 4. The evaluation "qualified" was given to the specimens where the absorbed energy $vE_{-10}$ was 40 J or more, and the evaluation "not qualified" was given to the specimens where the absorbed energy $vE_{-10}$ less than 40 J.

FIG. 1 shows the relationship between a parameter P (Mo, t)=[% Mo]×(t+550) and density of intermetallic compounds in respective examples of the disclosed embodiments and the comparison examples described in Table 4. As shown in FIG. 1, the relationship of [% Mo]×(t+550)≤2100 is established, and the specimens which have microstructures in each of which density of intermetallic compounds being precipitated in the marten site phase and having a particle diameter of 5 μm or more is 2×10$^4$/mm$^2$ or less have the absorbed energy $vE_{-10}$ of 40 J or more.

(D) Corrosion Resistance

Corrosion test specimens (thickness: 3 mm, width: 25 mm, length: 50 mm) were sampled from wall-thickness center portions of seamless steel pipes to which had been quenched and tempered, and weights of the specimens were mea ed. The corrosion test was carried out such that the specimens were immersed for 14 days in 20 mass % of NaCl aqueous solution (solution temperature: 230° C., saturated with $CO_2$ gas of 3.0 MPa) held in an autoclave. After the completion of the run of corrosion test, weights of the corroded specimens were measured, and reduction amounts of weight between before and after the corrosion test were calculated in terms of thickness, and corrosion speeds (mm/year) were obtained. The results are described in Table 4. The evaluation "qualified" was given to the specimens where the corrosion speed was 0.127 mm/year or less, and the evaluation "not qualified" was given to the specimens where the corrosion speed exceeded 0.127 mm/year.

Next, surfaces of the corroded specimens which were already subjected to the corrosion test were observed using a loupe having the magnification of 50 times, and the presence or non-presence of the occurrence of pitting corrosion was checked. The results are described in Table 4. It is determined that pitting corrosion is present when pitting corrosion having a diameter of 0.5 mm or more was observed in the surface of the seamless steel pipe, and otherwise pitting corrosion is not present.

TABLE 4

| Steel pipe No. | Steel symbol | Kind of phase* | Microstructure | | | | Tensile property | | Toughness $vE_{-10}$ (J) | Hot workability Presence or non-presence of cracks | Corrosion resistance | | Remarks |
|---|---|---|---|---|---|---|---|---|---|---|---|---|---|
| | | | Ratio of M (volume %) | Ratio of α (volume %) | Ratio of γ (volume %) | Density of intermetallic compounds in M phase (particles/mm$^2$) | Yield strength YS (MPa) | Tensile strength TS (MPa) | | | Corrosion rate (mm/year) | Presence or non-presence of pitting corrosion | |
| 5 | B | M + α + γ | 64 | 23 | 13 | 796 | 864 | 988 | 80.9 | not present | 0.108 | not present | example |
| 6 | B | M + α + γ | 61 | 22 | 17 | 5967 | 816 | 943 | 92.2 | not present | 0.104 | not present | example |
| 7 | B | M + α + γ | 65 | 20 | 15 | 17439 | 790 | 984 | 46.8 | not present | 0.092 | not present | example |

TABLE 4-continued

| Steel pipe No. | Steel symbol | Kind of phase* | Microstructure | | | Density of intermetallic compounds in M phase (particles/mm²) | Tensile property | | Toughness vE₋₁₀ (J) | Hot workability Presence or non-presence of cracks | Corrosion resistance | | Remarks |
| | | | Ratio of M (volume %) | Ratio of α (volume %) | Ratio of γ (volume %) | | Yield strength YS (MPa) | Tensile strength TS (MPa) | | | Corrosion rate (mm/year) | Presence or non-presence of pitting corrosion | |
| --- | --- | --- | --- | --- | --- | --- | --- | --- | --- | --- | --- | --- | --- |
| 8 | B | M + α + γ | 62 | 26 | 12 | 24667 | 873 | 1008 | 31.8 | not present | 0.113 | not present | comparison example |
| 9 | C | M + α + γ | 52 | 35 | 13 | 1068 | 794 | 911 | 98.5 | not present | 0.064 | not present | example |
| 10 | C | M + α + γ | 46 | 38 | 16 | 4935 | 766 | 926 | 71.3 | not present | 0.072 | not present | example |
| 11 | C | M + α + γ | 43 | 43 | 14 | 22160 | 772 | 929 | 29.7 | not present | 0.061 | not present | comparison example |
| 12 | D | M + α + γ | 62 | 28 | 10 | 7637 | 799 | 1027 | 59.3 | not present | 0.081 | not present | example |
| 13 | D | M + α + γ | 70 | 22 | 8 | 13209 | 882 | 973 | 54.2 | not present | 0.099 | not present | example |
| 14 | D | M + α + γ | 62 | 27 | 11 | 26571 | 888 | 1011 | 38.1 | not present | 0.089 | not present | comparison example |
| 15 | E | M + α + γ | 60 | 30 | 10 | 2811 | 749 | 960 | 81.4 | not present | 0.182 | present | comparison example |
| 16 | F | M + α + γ | 55 | 17 | 28 | 3028 | 817 | 952 | 93.9 | present | 0.107 | not present | comparison example |
| 17 | G | M + α + γ | 62 | 21 | 17 | 1958 | 781 | 993 | 69.4 | not present | 0.063 | not present | example |
| 18 | G | M + α + γ | 61 | 23 | 16 | 25564 | 776 | 989 | 24.5 | not present | 0.083 | not present | comparison example |
| 19 | H | M + α + γ | 59 | 28 | 13 | 4364 | 807 | 992 | 88.5 | not present | 0.069 | not present | example |
| 20 | H | M + α + γ | 57 | 30 | 13 | 29634 | 800 | 1006 | 29 5 | not present | 0.073 | not present | comparison example |
| 21 | I | M + α + γ | 59 | 25 | 16 | 9463 | 862 | 986 | 93.2 | not present | 0.088 | not present | example |
| 22 | I | M + α + γ | 59 | 25 | 16 | 29463 | 816 | 982 | 30.5 | not present | 0.067 | not present | comparison example |
| 23 | J | M + α + γ | 53 | 35 | 12 | 3846 | 799 | 975 | 62.1 | not present | 0.172 | present | comparison example |
| 24 | K | M + α + γ | 56 | 15 | 29 | 8646 | 794 | 1035 | 73.5 | present | 0.073 | not present | comparison example |

*M: martensite, α: ferrite, γ: austenite

As can be clearly understood from Table 4, it is found that all examples of the disclosed embodiments have, although these examples are seamless steel pipes having a large wall thickness, high strength where YS 758 MPa (=110 ksi) or more, high toughness where $vE_{-10}$ is 40 J or more, and excellent corrosion resistance where no pitting corrosion occurred at a corrosion rate of 0.127 mm/year or less even in a high-temperature severe environment containing $CO_2$ and $Cl^-$. Further, it is found that no cracks occurred on surfaces of the examples of the disclosed embodiments, and the examples of the disclosed embodiments also have excellent hot workability.

To the contrary, among the comparison examples, the steel pipes No. 8, 11, 14, 18, 20, 22, which did not satisfy the above-mentioned formula (3) in tempering, exhibited $vE_{-10}$ of less than 40 J. That is, the comparison examples are inferior to the examples of the disclosed embodiments in terms of toughness.

The composition of the steel pipe No. 15 did not satisfy the above-mentioned formula (1) and exhibited YS of less than 758 MPa. Further, in the steel pipe No. 15, the corrosion rate exceeded 0.127 mm/year and pitting corrosion occurred. That is, steel pipe No. 15 is inferior to the examples of the disclosed embodiments in terms of strength and corrosion resistance.

The composition of the steel pipe No. 16 did not satisfy the above-mentioned formula (2) and cracks occurred in a surface of the steel pipe No, 16. That is, the steel pipe No. 16 is inferior to the examples of the disclosed embodiments in terms of hot workability.

In the steel pipe No. 23 the composition of which did not satisfy the above-mentioned formula (1), the corrosion rate of the steel pipe No. 23 exceeded 0.127 mm/year and pitting corrosion occurred. That is, the steel pipe No. 23 is inferior to the examples of the disclosed embodiments in terms of corrosion resistance.

The composition of the steel pipe No. 24 did not satisfy the above-mentioned formula (2) and cracks occurred in a surface of the steel pipe No. 24. That is, the steel pipe No. 24 is inferior to the examples of the disclosed embodiments in terms of hot workability.

The invention claimed is:

1. A method for manufacturing a seamless stainless steel pipe for Oil Country Tubular Goods by heating a billet having a chemical composition comprising, by mass %:
0.005 to 0.06% C;
0.05 to 0.5% Si;
0.2 to 1.8% Mn;
0.03% or less P;
0.005% or less S;
15.5 to 18.0% Cr;
1.0 to 3.5% Mo;
1.5 to 5.0% Ni;
0.02 to 0.2% V;
0.002 to 0.05% Al;
0.01 to 0.15% N;
0.006% or less O;
at least one element selected from the group consisting of 0.5 to 3.0% W and 0.5 to 3.5% Cu; and
Fe and unavoidable impurities as a balance, the contents of C, Si, Mn, Cr, Mo, Ni, N, W and Cu satisfying the following formulae (1) and (2):

$$[\% \text{Cr}]+0.65[\% \text{Ni}]+0.6[\% \text{Mo}]+0.3[\% \text{W}]+ 0.55[\% \text{Cu}]-20[\% \text{C}] \geq 19.5 \quad (1)$$

$$[\% \text{Cr}]+[\% \text{Mo}]+0.5[\% \text{W}]+0.3[\% \text{Si}]- 43.5[\% \text{C}]-0.4[\% \text{Mn}]-[\% \text{Ni}]-0.3[\% \text{Cu}]- 9[\% \text{N}] \geq 11.5 \quad (2)$$

where [% C], [% Si], [% Mn], [% Cr], [% Mo], [% Ni], [% N], [% W], [% Cu]: contents (mass %) of respective elements, the content of the element being expressed as zero when the element is not contained, the method comprising:

forming the billet into a seamless steel pipe by applying hot working to the billet;

cooling the seamless steel pipe to a room temperature at a cooling rate of air cooling or more;

thereafter, performing quenching by heating the seamless steel pipe to a temperature of 850° C. to 960° C.;

subsequently, cooling the seamless steel pipe to a temperature of 40° C. or below at a cooling rate of air cooling or more; and subsequently, applying tempering to the seamless steel pipe at a temperature of 600° C. or below for a holding time which satisfies the following formula (3)

$$[\% \text{Mo}] \times (t+550) \leq 2100 \quad (3)$$

where t: holding time (min) of tempering, wherein the steel pipe has a microstructure formed of, by vol %, 10 to 60% of a ferrite phase, 0 to 20% of an austenite phase and a remaining portion formed of a martensite phase, a density of intermetallic compounds being present in the martensite phase and having a particle diameter of 0.5 μm or more is $9.463 \times 10^3/\text{mm}^2$ or less, and a yield strength of 758 MPa or more.

2. The method for manufacturing a seamless stainless steel pipe for Oil Country Tubular Goods according to claim 1, wherein the chemical composition further comprises, by mass %, at least one element selected from the group consisting of 0.2% or less Nb, 0.3% or less Ti, 0.2% or less Zr and 0.01% or less B.

3. The method of manufacturing a seamless stainless steel pipe for Oil Country Tubular Goods according to claim 2, wherein the chemical composition further comprises, by mass %, 0.01% or less Ca.

4. The method for manufacturing a seamless stainless steel pipe for Oil Country Tubular Goods according to claim 1, wherein the chemical composition further comprises, by mass %, 0.01% or less Ca.

5. The method for manufacturing a seamless stainless steel pipe for Oil Country Tubular Goods according to claim 1, wherein a corrosion speed of the seamless stainless steel pipe is 0.127 mm/year or less.

6. The method for manufacturing a seamless stainless steel pipe for Oil Country Tubular Goods according to claim 5, wherein the seamless stainless steel pipe does not contain a crack with a length of 5 mm or more.

7. A seamless stainless steel pipe for Oil Country Tubular Goods having a chemical composition comprising, by mass %:

0.005 to 0.06% C;
0.05 to 0.5% Si;
0.2 to 1.8% Mn;
0.03% or less P;
0.005% or less S;
15.5 to 18.0% Cr;
1.0 to 3.5% Mo;
1.5 to 5.0% Ni;
0.02 to 0.2% V;
0.002 to 0.05% Al;
0.01 to 0.15% N;
0.006% or less O;
at least one element selected from the group consisting of 0.5 to 3.0% W and 0.5 to 3.5% Cu; and
Fe and unavoidable impurities as a balance, the contents of C, Si, Mn, Cr, Mo, Ni, N, W and Cu satisfying the following formulae (1) and (2):

$$[\% \text{Cr}]+0.65[\% \text{Ni}]+0.6[\% \text{Mo}]+0.3[\% \text{W}]+ 0.55[\% \text{Cu}]-20[\% \text{C}] \geq 19.5 \quad (1)$$

$$[\% \text{Cr}]+[\% \text{Mo}]+0.5[\% \text{W}]+0.3[\% \text{Si}]- 43.5[\% \text{C}]-0.4[\% \text{Mn}]-[\% \text{Ni}]-0.3[\% \text{Cu}]- 9[\% \text{N}] \geq 11.5 \quad (2)$$

where [% C], [% Si], [% Mn], [% Cr], [% Mo], [% Ni], [% N], [% W], [% Cu]: contents (mass %) of respective elements, the content of the element being expressed as zero when the element is not contained, wherein the steel pipe has a microstructure formed of, by vol %, 10 to 60% of a ferrite phase, 0 to 20% of an austenite phase and a remaining portion formed of a martensite phase, a density of intermetallic compounds being present in the martensite phase and having a particle diameter of 0.5 μm or more is $9.463 \times 10^3/\text{mm}^2$ or less, and a yield strength of 758 MPa or more.

8. The seamless stainless steel pipe for Oil Country Tubular Goods according to claim 7, wherein the chemical composition further comprises, by mass %, at least one element selected from the group consisting of 0.2% or less Nb, 0.3% or less Ti, 0.2% or less Zr and 0.01% or less B.

9. The seamless stainless steel pipe for Oil Country Tubular Goods according to claim 8, wherein the chemical composition further comprises, by mass %, 0.01% or less Ca.

10. The seamless stainless steel pipe for Oil Country Tubular Goods according to claim 7, wherein the chemical composition further comprises, by mass %, 0.01% or less Ca.

11. The seamless stainless steel pipe for Oil Country Tubular Goods according to claim 7, wherein a corrosion speed of the seamless stainless steel pipe is 0.127 mm/year or less.

12. The seamless stainless steel pipe for Oil Country Tubular Goods according to claim 11, wherein the seamless stainless steel pipe does not contain a crack with a length of 5 mm or more.

* * * * *